United States Patent Office 3,702,889
Patented Nov. 14, 1972

3,702,889
PROCESS FOR MAKING ACTIVATED
MANGANESE DIOXIDE
Irving M. Goldman, Niantic, Conn., assignor to Pfizer
Inc., New York, N.Y.
No Drawing. Continuation of abandoned application Ser.
No. 733,784, June 3, 1968. This application Oct. 19,
1970, Ser. No. 82,142
Int. Cl. C01g 45/02; B01j 11/32
U.S. Cl. 423—605
9 Claims

ABSTRACT OF THE DISCLOSURE

Wet precipitated manganese dioxide is activated by removal of water by extraction or azeotropic distillation with inert water entrainers.

This application is a continuation of application Ser. No. 733,784, filed June 3, 1968, and now abandoned.

BACKGROUND OF THE INVENTION

This invention relates to a novel process for preparing activated manganese dioxide from wet precipitated manganese dioxide by contacting it with an inert water entraining agent.

Although manganese dioxide, particularly as an oxidizing agent in organic chemistry, has found many applications, it has never achieved significant commercial importance. Originally considered as a relatively selective oxidizing agent for allylic alcohols, on which substrates it provides elegant and convenient preparative procedures, it is now known to be less specific for such substrates. Activated manganese dioxide has, in fact, been found to have many applications in preparative organic chemistry on a variety of substrates including aliphatic, cycloaliphatic and benzylic alcohols, acetylenic alcohols, diarylmethanes, primary and secondary amines, diamines, glycols and hydroxy acids, aldehydes, oximes, hemiacetals, sulfides, α-amino acids, α-amino alcohols and aromatic aldehydes over a wide range of time, quantity of oxidizing agent, temperature, solvent polarity and method for its preparation.

Prior art methods for making activated manganese dioxide generally involve the precipitation of manganese dioxide from aqueous alkaline or acid media, followed by thorough washing of the precipitate and drying at an elevated temperature, often for prolonged periods, to activate the manganese dioxide. The product, in most cases, must then be ground and sized, with the drying, grinding and sizing steps ofter repeated. The overall known processes of activation are time-consuming, uneconomic and not always productive of consistent results.

Precipitated manganese dioxide is most often prepared by the reaction of manganese sulfate with potassium permanganate in hot aqueous solution [Attenburrow et al., J. Chem. Soc., 1094 (1952)]. The manganese dioxide is collected by filtration or centrifugation, washed thoroughly with water, and then activated by drying at 100°–125° C. The dry material is then ground to a fine powder before use. Pratt et al. [J. Org. Chem., 26, 2973 (1961)], in a modification of the Attenburrow procedure, employed a total drying time of fifty-two hours and two grinding steps in their activation process. In a further modification of the Attenburrow procedure, Pratt et al. [J. Org. Chem., 28, 638 (1963)] employed a drying time of three days at 125° C.

Mancera et al. [J. Chem. Soc., 2189 (1953)] conducted the above reaction under strongly acidic conditions by omitting the addition of alkali. The precipitated manganese dioxide is washed, collected and dried to constant weight.

Another method for preparing precipitated manganese dioxide involves the reaction of manganous acetate dissolved in sulfuric acid solution with ammonium persulfate [Gritter et al., J. Org. Chem., 24, 1051 (1959)]. The manganese dioxide is filtered, washed and activated by drying at 60° C. for two days.

In still other methods (Gritter et al., loc. cit.), precipitated manganese dioxide is prepared by the following methods: (a) barium permanganate plus sulfuric acid; (b) manganous chromate in sulfuric acid solution and ammonium persulfate; (c) manganous chloride and hydrogen peroxide under mild alkaline conditions. In each of these methods the manganese dioxide is collected, washed with water and dried at 60° C. for two days to activate the material. Henbest et al., J. Chem. Soc., 4909 (1957), reacted manganous sulfate with potassium permanganate in alkaline solution for five minutes, recovered the manganese dioxide, washed with water followed by aqueous sodium bicarbonate to pH 5–7 and dried overnight at 100°–120° C. to prepare activated manganese dioxide.

It is noted that Pratt et al. [J. Org. Chem., 28, 638 (1963) and 29, 1540 (1964)] report that activated manganese dioxide prepared by a modified Attenburrow procedure and allowed to equilibrate with atmospheric moisture for five days, during which time it gained over 5% in weight, is of improved reproducibility as an oxidizing agent. Their procedure for studying reaction rates, based upon determination of the by-product water formed, included drying the activated manganese dioxide by refluxing in benzene for five hours prior to addition of substrate. The manganese dioxide was already activated prior to this drying step. The azeotropic distillation served to dry reactants and apparatus, thereby facilitating the ensuing rate studies.

A similar drying step was also reported by Pratt et al. [J. Org. Chem., 26, 2973 (1961)] in a reaction rate study involving the oxidation of phenylcarbinols by activated manganese dioxide. Here again the purpose of the azeotropic distillation with benzene was only to dry the system, reactants and apparatus, to permit determination of the by-product water produced.

It is noted by R. M. Evans [Quart. Rev., 13, 61 (1959)] that activated manganese dioxide is not a well-defined substance. The activated material is considered to be an amorphous hydrate. Activated material prepared by the Attenburrow procedure, for example, is reported to contain about 4–7% of excess moisture.

While there are no specific criteria for determining the degree of activation of a given preparation of activated manganese dioxide, a fair measure of the activity of a given sample of manganese dioxide can be conveniently estimated by determining the efficiency of oxidation of a substrate such as benzyl alcohol in an inert solvent at room temperature. Highly active material, for example, is capable of oxidizing about one-sixth its weight of benzyl alcohol to benzaldehyde, or cinnamyl alcohol to cinnamaldehyde [Weedon et al., J. Chem. Soc., 2687 (1951)], in a petroleum solvent at room temperature in less than one hour.

SUMMARY OF THE INVENTION

It has now been found that activated manganese dioxide can be simply, economically and reproducibly prepared from wet precipitated manganese dioxide produced according to the above-mentioned reactions by the simple expedient of removing, except for some water of hydration, water present by contacting the inactive wet precipitated manganese dioxide with an inert water entrainer.

The term "wet precipitated manganese doxide" as used herein is intended to refer to and include manganese dioxide wet, damp or moist with water and manganese dioxide containing occluded or adsorbed water and water of hydration in excess of an optimal or necessary amount of water of hydration. This amount is determined by checking the activity of the manganese dioxide as described above.

The term "inert water entrainer" as used herein is intended to refer to an organic solvent which may be miscible or immiscible with water and which does not react chemically with manganese dioxide. Many of the entrainers useful in the herein described processes, and particularly those of value in the extraction process, have some avidity for water. The term "avidity" as used herein is intended to mean that the solubility of water in the inert water entrainer is at least about 1%.

Many of the entrainers operative for the removal of water as described herein are rather strongly adsorbed by the manganese dioxide. Entrainers containing hydroxylic, carboxylic and amino groups fall into this group. While such entrainers successfully remove water from wet precipitated manganese dioxide, the manganese dioxide thus activated is of reduced activity, at least initially when used as an oxidizing agent, since the adsorbed entrainer must first be displaced by the substrate for efficient oxidation to occur. The preferred entrainers are those which do not contain hydroxylic, carboxylic or amino groups such as alcohols, phenols, carboxylic acids and amines.

DETAILED DESCRIPTION OF THE INVENTION

In the process of this invention, wet precipitated manganese dioxide prepared as described above is collected by any suitable means such as filtration or centrifugation, washed thoroughly with water and as much water as possible removed as by a filter press or centrifugation or other similar method. The improved process of this invention comprises contacting the wet precipitated manganese dioxide with an inert water entrainer and subsequently removing the entrainer and any water associated therewith. Removal of the entrainer, or entrainers, together with any water associated therewith can be accomplished in several ways. It can, for example, be removed simply by decantation, filtration, centrifugation or related methods known to those skilled in the art. When conducted in this manner, the activation process is considered to be essentially an extraction process, the water being removed or extracted by an entrainer having an avidity for water. Alternatively, and preferably, the entrainer, or entrainers, and any water associated therewith are removed by azeotropic distillation.

For operation of the preferred process of this invention, entrainers which form suitable azeotropic systems with water include those substances listed by Horsley, Ind. Eng. Chem. 19, 509–511 (1947) which meet the above criteria. Binary or ternary azeotropic systems are operative. Representative of such entrainers which form a binary azeotropic system with water are the following: benzene, carbon tetrachloride, chloroform, cis- and trans-1,3-dichloroethylene, acetonitrile, propionitrile, 1-chloropropane, butyronitrile, isobutyronitrile, dioxane, ethyl chloroacetate, ethyl ether, 2-butanone, ethyl acetate, methyl propionate, 1-chlorobutane, methyl propyl ether, pyridine, 2-pentanone, 3-pentanone, 3-methyl-2-butanone, ethyl propionate, chlorobenzene, 2-picoline, cyclohexane, 4-methyl-2-pentanone, 3,3-dimethyl-2-butanone, butyl acetate, isopropyl acetate, sec-butyl acetate, t-butyl ethyl ether, anisole, methyl benzoate, phenyl ether, toluene, isoamyl ether, 2-hexanone.

Representative of such entrainers which form a ternary azeotropic system with water are: carbon tetrachloride-2-butanone; acetone-2-methylfuran; 2-butanone-benzene; pyridine-methylcyclohexane; 2-butanone-1-hexene; 2-butanone-2-hexene; 2-butanone - 3 - hexene; 2-butanone-3-methyl-2-pentene; 2-butanone-3-methylpentane; and 2-butanone-2-methyl-2-pentene.

In the preferred aspect of this invention, azeotropic removal of water, the boiling point of the azeotropic system is not critical for the purpose of this invention. Entrainers which form azeotropic systems with water and which boil at temperatures ranging from about 35° C. to about 200° C. are operative. The azeotropic systems with water formed by such entrainers boil within the range of from about 34° C. to about 100° C. Representative entrainers having boiling points at these extremes are ethyl ether (B.P.=34.5° C.) and methyl benzoate (B.P. 199.5° C.). The entrainers favored for azeotropic removal of water are those boiling within the range of from about 35° C. to about 130° C. The preferred entrainers, those boiling within the temperature range of from about 60° C. to about 110° C., form binary azeotropic systems with water which boil at from about 56° C. to about 85° C. and include benzene, toluene and chloroform.

The azeotropic distillation is most conveniently conducted at atmospheric pressure. Higher or lower pressures can, of course, be used but offer no advantage. The time required for removal of water from a given batch of wet precipitated manganese dioxide is, of course, dependent upon the temperature of the azeotropic distillation. The higher the temperature of the distillation the shorter the heating period necessary to achieve activation of the manganese dioxide. When using the higher boiling entrainers, that is, those boiling above about 130° C., the heating is desirably stopped when the temperature begins to rise above about 130° C. in order to avoid removal of necessary water of hydration and possible decomposition of the manganese dioxide. It is for these reasons that entrainers boiling above about 200° C., e.g. phenyl ethyl ether (B.P. 259.3° C.), even though fully operative in this process, are not normally selected.

Atmospheric pressure is favored in both the azeotropic and extractive methods of water removal from the standpoint of simplicity and convenience. Pressures greater than or less than atmospheric pressure can, of course, be used, but afford no advantages. Suitable agitation is, of course, required for both the azeotropic and extractive procedures.

When removal of water, except for necessary water of hydration, with a given entrainer is complete, as can be determined by gas-liquid chromatography according to known procedures, or, in many instances, by visual observation of the distillate, the manganese dioxide is ready for use. The chosen entrainer can, of course, serve as solvent for the oxidation reaction in which the activated manganese dioxide is used as oxidizing agent or it can be decanted or filtered or removed by other known methods and replaced by other solvents. However, from the standpoint of convenience, the entrainer is generally chosen with subsequent reactions in mind.

The other aspect of this invention, removal of water from wet precipitated manganese dioxide by extraction, permits somewhat greater latitude in the choice of entrainers as regards the temperature parameter. Temperatures of from about the freezing point of water to about 200° C. are operative. From a practical standpoint, determined, of course, by the boiling point of the chosen entrainer, it is convenient to employ temperatures ranging from about ambient temperature to about 100° C. The preferred temperature for this extraction process is from about 20° C. to about 60° C.

The essential criteria for the choice of entrainers for the extractive removal of water is that they have an avidity for water or that water be reasonably soluble in the entrainer, These criteria, of course, include many entrainers which contain hydroxylic, carboxylic and amino groups. While such entrainers, as previously noted, successfully extract water from wet precipitated manganese dioxide, they are desirably not used because of their adsorption by the manganese dioxide.

Suitable entrainers for the extraction process include, of course, many of the entrainers named above for the azeotropic removal of water. Operative entrainers include a variety of structural types such as ethers, ketones, nitriles, esters and amides. Representative entrainers include ethyl ether, methyl propyl ether, acetonitrile, propionitrile, butyronitrile, dioxane, tetrahydrofuran, acetone, methyl ethyl ketone, ethyl acetate, N,N-dimethylformamide, N,N-dimethylacetamide, dimethyl sulfoxide and hexamethylphosphoramide.

The removal of water by extraction is readily accomplished by contacting the wet precipitated manganese dioxide with the chosen entrainer and than separating the entrainer and water associated therewith by filtration, or equivalent methods such as centrifugation or decantation. The process can, of course, as one skilled in the art will immediately recognize, be conducted as a batch or continuous operation. When conducted as a batch process the removal of water is best accomplished by contacting, and desirably agitating, the wet precipitated manganese dioxide repeatedly with several batches of entrainer. The process is operated continuously by passage of the chosen entrainer through a column of the wet precipitated manganese dioxide. The volume of entrainer used depends, of course, upon the solubility of water in the chosen entrainer and upon the temperature. A sufficient total volume of the chosen entrainer is used such that water is no longer removed. This point is conveniently determined qualitatively by gas-liquid chromatography or other methods known to those skilled in the art.

A mixture of entrainers can be used in this extraction process but no advantage appears to be gained by such a modification.

EXAMPLE I

A solution of manganese sulfate tetrahydrate (555 g.) in water (750 ml.) and a solution of sodium hydroxide (40%: 585 ml.) are added simultaneously over a period of one hour to a hot stirred solution of potassium permanganate (480 g.) in water (3 l.). The mixture is stirred for one hour following completion of addition and the precipitated manganese dioxide collected by filtration and washed thoroughly with water until the filtrate is colorless. After the final wash the filter cake is allowed to remain on the funnel under suction for 24 hours. Surface cracks are closed with a flat spatula to facilitate removal of most of the water. The wet filter cake is then cut into chunks and stored in closed bottles.

Activation of small quantities of the wet manganese dioxide is accomplished by the following procedure.

Benzene (150 ml.) and wet precipitated manganese dioxide (25 g.) are placed in a 250 ml. flask fitted with a Dean-Stark trap condenser and magnetic stirrer. The suspension is then subjected to azeotropic distillation until water is no longer collected. The manganese dioxide activated in this fashion is a black dense material in contrast to the fine brown precipitated solid.

From 25 g. of wet precipitated manganese dioxide, 10 g. of activated material are obtained. It is found by combustion analysis to contain 7.1% water.

The original blackish-brown, somewhat lumpy, wet precipitated manganese dioxide becomes black and dense in appearance after removal of water by these methods. It is composed of macro-particles as opposed to a fine silt-like material. The material activated in this way has been stored in benzene in stoppered flasks for over one year without loss of activity. Other entrainers are equally effective for storage. Alternatively, the entrainer can be removed by known methods, such as filtration or decantation, followed by air drying, drying in vacuo, or by other methods known to those skilled in the art, and the dried activated material stored indefinitely.

EXAMPLE II

The procedure of Example I is repeated with the difference that the filter cake is pressed as dry as possible on the filter prior to activation. Twenty-five g. of wet filter cake thus produced provides 15 g. of activated manganese dioxide upon azeotropic distillation with benzene.

EXAMPLE III

The procedure of Example II is repeated but the wet precipitated manganese dioxide is activated by azeotropic removal of water with the following entrainers: carbon tetrachloride, chloroform, cis-1,2-dichloroethylene, trans-1,2-dichloroethylene, acetonitrile, propionitrile, 1-chloropropane, butyronitrile, dioxane, ethyl ether, 2-butanone, dioxane, ethyl acetate, methyl propionate, 1-chlorobutane, methyl propyl ether, 2-pentanone, ethyl propionate, chlorobenzene, 2-picoline, cyclohexane, 4-methyl-2-pentanone, pyridine, 3,3-dimethyl-2-butanone, t-butyl ethyl ether, anisole, methyl benzoate, toluene, isoamyl ether, 2-hexanone.

EXAMPLE IV

The process of Example I is repeated with the difference that the precipitated manganese dioxide is collected by centrifugation rather than by filtration.

EXAMPLE V

A solution of concentrated aqueous potassium permanganate is added to a stirred solution of manganese sulfate monohydrate (169 g.) in water (300 ml.) at 90° C. until a slight excess is present as determined by a pale pink color of the aqueous phase. The mixture is stirred at 90° C. for 15 minutes, then the precipitated manganese dioxide cooled by filtration, washed with warm water until the filtrate is colorless and pressed as dry as possible. Wet precipitated manganese dioxide prepared in this manner is activated by azeotropic distillation with benzene, toluene, ethyl ether, phenyl ether, ethyl chloroacetate, acetonitrile, cyclohexane, isopropyl acetate, anisole, 2-hexanone and chloroform.

EXAMPLE VI

Wet precipitated manganese dioxide (25 g. quantities) prepared as described in Example I is activated by the extraction process by slurrying with 200 ml. of the chosen entrainer, then filtering and repeating the process until the entrainer is found to be free of water by gas-liquid chromatography.

In this manner, activated manganese dioxide is prepared using the following entrainers.

| Entrainer: | Volume of entrainer |
|---|---|
| Acetonitrile | 5×200 ml. |
| Ethyl ether | 10×200 ml. |
| Tetrahydrofuran | 5×200 ml. |
| N,N-dimethylformamide | 5×200 ml. |
| N,N-dimethylacetamide | 5×200 ml. |
| Propionitrile | 5×200 ml. |
| Ethyl acetate | 5×200 ml. |
| Methyl ethyl ketone | 5×200 ml. |
| Acetone | 10×200 ml. |
| Methyl propyl ether | 10×200 ml. |
| Dioxane | 5×200 ml. |
| Hexamethylphosphoramide | 8×200 ml. |
| Dimethyl sulfoxide | 8×200 ml. |
| Butyronitrile | 5×200 ml. |

EXAMPLE VII

The procedure of Example VI is conducted with the following entrainers with the difference that various temperatures of extraction are employed:

| Entrainer: | Temperature ° C. |
|---|---|
| Ethyl ether | 5, 15 |
| Dioxane | 10, 50 |
| Acetonitrile | 0, 15, 60 |
| Propionitrile | 75 |
| N,N-dimethylformamide | 100 |
| Dioxane | 60 |
| Methyl propyl ether | 10 |
| N,N-dimethylacetamide | 60, 110 |
| Acetone+acetonitrile (1—1) | 10, 25 |
| Tetrahydrofuran | 20, 50 |
| Acetonitrile+dioxane (2—1) | 10, 40, 60 |

EXAMPLE VIII

Wet precipitated manganese dioxide prepared as described in Example II is activated using the following ternary systems as azeotropes:

carbon tetrachloride-2-butanone
acetone-2-methylfuran
2-butanone-benzene
pyridine-methylcyclohexane
2-butanone-1-hexene
2-butanone-2-hexene
2-butanone-3-hexene
2-butanone-3-methyl-2-pentene
2-butanone-3-methylpentane
2-butanone-2-methyl-2-pentene

EXAMPLE IX

To 15 g. of activated manganese dioxide prepared by the process of Example I in benzene (125 ml.) is added benzyl alcohol (7 ml.) and the mixture stirred at room temperature for one hour. The reaction mixture is filtered through diatomaceous earth and the filter cake washed with three 20 ml. volumes of benzene. The combined filtrate and wash solutions are evaporated to small volume under reduced pressure and the benzaldehyde isolated as the 2,4-dinitrophenyl hydrazone. 6.8 g. of the 2,4-dinitrophenyl hydrazone of benzaldehyde is obtained.

In like manner, the activity of the manganese dioxide activated by the use of the other entrainers utilized in Examples I–VIII is demonstrated.

The manganese dioxide thus activated readily oxidizes allyl alcohol, benzyl alcohol, cinnamyl alcohol, methyl phenyl carbinol, pinacol, hydroquinone, benzopinacol, benzoin, dihydrobenzoin, mandelic acid, 1-phenylethanolamine, ethyl mandelate and mandelamide, for example.

I claim:

1. In the process of making activated manganese dioxide by the removal of occluded or adsorbed water from inactive wet precipitated manganese dioxide, the improvement which comprises contacting the inactive wet precipitated manganese dioxide with an organic inert water entrainer which solubilizes water to the extent of at least about 1% and is substantially free of hydroxylic, carboxylic and amino groups, at a temperature of from about 0° C. to about 200° C., and subsequently removing said entrainer together with said water associated therewith.

2. The process of claim 1 wherein the entrainer and water associated therewith are removed by azeotropic distillation.

3. The process of claim 1 wherein the entrainer and water associated therewith are removed by filtration.

4. The process of claim 2 wherein the entrainer is selected from the group consisting of the following: benzene, carbon tetrachloride, chloroform, cis- and trans-1,2-dichloroethylene, acetonitrile, propionitrile, 1-chloropropane, butyronitrile, dioxane, ethyl ether, 2-butanone, ethyl acetate, methyl propionate, 1-chlorobutane, methyl propyl ether, pyridine, 2-pentanone, ethyl propionate, chlorobenzene, 2-picoline, cyclohexane, 4-methyl-2-pentanone, 3,3-dimethyl-2-butanone, t-butyl ethyl ether, anisole, methyl benzoate, toluene, isoamyl ether and 2-hexanone.

5. The process of claim 4 wherein the boiling temperature of the azeotropic distillation is from about 60° C. to about 110° C.

6. The process of claim 3 wherein the entrainer is selected from the group consisting of ethyl ether, methyl propyl ether, acetonitrile, propionitrile, butyronitrile, dioxane, tetrahydrofuran, acetone, methyl ethyl ketone, ethyl acetate, N,N-dimethylformamide, N,N-dimethylacetamide, dimethyl sulfoxide and hexamethylphosphoramide.

7. The process of claim 4 wherein the entrainer is selected from the group consisting of benzene, toluene and chloroform.

8. The process of claim 6 wherein the wet precipitated manganese dioxide is contacted with an inert entrainer at a temperature of from about 20° C. to about 60° C.

9. The process of claim 8 wherein the entrainer is selected from the group consisting of acetone, N,N-dimethylformide and acetonitrile.

References Cited

Pratt et al.: "Oxidation by Solids," etc. J. Organic Chem. 26, 1961, p. 2975; 28, 1963, pp. 640, 641, and 642; 29, 1964, p. 1542.

OSCAR R. VERTIZ, Primary Examiner

H. S. MILLER, Assistant Examiner

U.S. Cl. X.R.

252—471